United States Patent [19]

Hanks et al.

[11] Patent Number: 4,735,790

[45] Date of Patent: * Apr. 5, 1988

[54] ANTIMONY THIOANTIMONATE LUBRICANT ADDITIVE AND PREPARATION

[75] Inventors: William V. Hanks; Charles B. Lindahl; Dayaldas T. J. Meshri, all of Tulsa, Okla.; James P. King, Upper Gwynedd, Pa.

[73] Assignee: Pennwalt Corporation, Philadelphia, Pa.

[*] Notice: The portion of the term of this patent subsequent to Jun. 23, 2004 has been disclaimed.

[21] Appl. No.: 937,170

[22] Filed: Dec. 2, 1986

[51] Int. Cl.$^4$ .................... C10M 125/24; C01B 17/00
[52] U.S. Cl. .................. 423/561 R; 423/562; 252/25; 252/28; 252/46.4
[58] Field of Search .............. 252/25; 423/561 R, 562

[56] References Cited

U.S. PATENT DOCUMENTS

| | | | |
|---|---|---|---|
| 2,890,102 | 6/1959 | Bundy | 423/561 R |
| 3,377,277 | 4/1968 | Soulen | 252/25 |
| 3,965,016 | 6/1976 | Soulen | 252/25 |
| 4,029,741 | 6/1977 | Coltrinari | 423/561 R |
| 4,465,604 | 8/1984 | King | 252/25 |
| 4,557,839 | 12/1985 | Tubbs et al. | 252/25 |
| 4,675,168 | 6/1987 | King et al. | 252/25 |

FOREIGN PATENT DOCUMENTS 151422 9/1920 United Kingdom ........... 423/561 R

*Primary Examiner*—Jacqueline V. Howard
*Assistant Examiner*—Ellen McAvoy

[57] ABSTRACT

Method of preparing $SbSbS_4$ product having a low level of free sulfur impurity, which includes mixing aqueous solutions of an alkali metal thioantimonate and a halide stabilized antimony trihalide to form a reaction mixture, while maintaining the reaction mixture at a pH of less than 7, to provide the $SbSbS_4$ product having a low level of free sulfur impurity.

44 Claims, No Drawings

ANTIMONY THIOANTIMONATE LUBRICANT ADDITIVE AND PREPARATION

BACKGROUND OF THE INVENTION

Antimony thioantimonate, $Sb(SbS_4)$, is useful as a lubricant additive. The compound is actually a "complex" compound in the sense that each of the two antimony atoms probably exist in different valence states, i.e. the $+3$ and $+5$ states.

Antimony thioantimonate ($SbSbS_4$) has been prepared by reaction of antimony oxide (dissolved in cone potassium hydroxide solution) with sodium thioantimonate ($Na_3SbS_4$) in an aqueous medium followed by neutralization of the resulting solution with an acid. See, for example, J. P. King and Yayesh Asmerom, "Investigation of Extreme-Pressure and Antiwear Properties of Antimony Thioantimonate", ASLE Transaction, Vol. 24, 4, 497–504 (1981); and U.S. Pat. No. 3,965,016, to Soulen (issued June 22, 1976). The overall reaction can be written as follows:

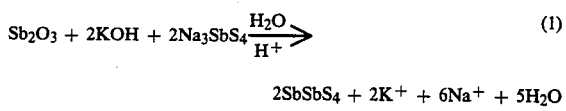

$$Sb_2O_3 + 2KOH + 2Na_3SbS_4 \xrightarrow[H^+]{H_2O} \quad (1)$$

$$2SbSbS_4 + 2K^+ + 6Na^+ + 5H_2O$$

There are severe limitations associated with the above reaction, i.e., (1) co-precipitation of free sulfur (6%) with the final product and (2) generation of hydrogen sulfide during neutralization. Subsequent studies have shown that a side reaction simultaneously occurs during the neutralization step, as follows:

$$2Na_3SbS_4 + 6H^+ \rightarrow SbSbS_4 + 3H_2S + S6Na^+ \quad (2)$$

Excessive amounts (more than about 1%) of free sulfur in lubricant additives (such as $SbSbS_4$ and others) are highly undesirable because the free sulfur promotes corrosion of copper-containing metal parts. Because of the added costs in removing free sulfur from the final product and collecting $H_2S$, an improved and economic manufacturing process for preparing $SbSbS_4$ is highly desirable.

This invention involves a modified reaction route with straight-forward processing conditions to prepare $SbSbS_4$ having a low sulfur content. The new process can produce $SbSbS_4$ containing free sulfur at the more acceptable level of about 1% or less. Furthermore, generation of $H_2S$ and other decomposition or products of hydrolysis are virtually eliminated. Moreover, the process is easily controlled and can be operated as a continuous process. The process is rendered even more highly economical as the halide stabilized antimony trihalide reactant can be prepared by treatment of $Sb_2O_3$ with concentrated HCl and NaCl and then used, preferably in the form of $NaSbCl_4$, as a reactant in the aqueous form of solution, without the severe hydrolysis and decomposition problems customarily associated with conventional antimony trihalides.

This invention includes a novel method for producing antimony thioantimonate, $SbSbS_4$, by continuously feeding two reactants into a reactor and withdrawing the $SbSbS_4$ therefrom. The reaction product is subsequently centrifuged, washed and dried as part of the continuous process. The use of a water-soluble, halide-stablized antimony trihalide complex as one of the starting materials enhances the economics of the process significantly and greatly facilitates the overall processing operation, including enhanced yields and a low level of undesirable products of decomposition and/or side reactions.

SUMMARY OF THE INVENTION

The method of this invention is broadly defined as the method of preparing $SbSbS_4$ product having a low level of free sulfur impurity, comprising mixing aqueous solutions of an alkali metal thioantimonate and a halide stabilized antimony trihalide to form a reaction mixture, while maintaining the reaction mixture at a pH of less than 7, to provide the $SbSbS_4$ product having a low level of free sulfur impurity.

Preferably, the alkali metal thioantimonate is sodium thioantimonate and the trihalide is antimony trichloride and the pH within the reaction mixture is maintained at less than 7.

It is preferred that the alkali metal thioantimonate and trihalide solutions are rapidly mixed and the trihalide is present in molar excess to provide a lower level of free sulfur impurity.

In the practice of the method as a batch method, the alkali metal thioantimonate is added while mixing to the trihalide solution. As a continuous method, the alkali metal thioantimonate and trihalide solutions are continuously metered into a mixing zone from which the $SbSbS_4$ product is discharged as a slurry.

The preferred reaction temperature is less than about 30° C.

The halide stabilized antimony trihalide is formed by subjecting a mixture of $Sb_2O_3$ and concentrated HX to reaction conditions to provide an aqueous solution of the halide stabilized antimony trihalide. It is believed that the trihalide complex is $HSbX_4$, where X is halogen and preferably Cl. It is preferred to then add excess NaCl and some additional $Sb_2O_3$ to the solution as shown in the examples. The HCl is preferably added in slight excess (6 moles HCl per mole of $Sb_2O_3$ is stoichiometric).

The trihalide can also be formed similarly from Sb metal, rather than $Sb_2O_3$, in which case it is preferred to use also an oxidizer such as $H_2O_2$.

The $SbSbS_4$ product is separated from the reaction mixture and then washed to reduce the chloride content of the product to less than 300 ppm.

The continuous method of practicing the invention is defined as the method of preparing $SbSbS_4$ product having a low level of free sulfur impurity, comprising:

(a) metering at controlled rates separate streams of aqueous solutions of an alkali metal thioantimonate and a halide stabilized antimony trihalide into a mixing zone to form a reaction mixture;

(b) maintaining a pH of less than 7 within the reaction mixture; and then (c) withdrawing the $SbSbS_4$ product from the mixing zone.

The most preferred pH of the reaction mixture is less than 5. In the continuous method, the pH is most preferably maintained by regulating the ratio of the metering rates of the separate streams. Use of the $NaSbCl_4$ complex is also preferred.

The $SbSbS_4$ product is washed to reduce the chloride content of the product to less than 300 ppm based on the weight of product.

In the continuous method, preferably, the withdrawn product and remaining reaction mixture are transferred to a receiving vessel with continued mixing.

The product of the invention is described as the $SbSbS_4$ product of the above methods, or, in the alternative, as a composition comprising $SbSbS_4$ and a halide stabilized antimony trihalide (preferably $SbCl_3$ at a concentration of less than 300 ppm).

DESCRIPTION OF THE PREFERRED EMBODIMENTS

This method includes the proportional mixing of two aqueous solutions of raw materials ($Na_3SbS_4$ and $SbCl_3$ complex) through tube-type metering pumps into a centrifugal mixing pump which discharges the $SbSbS_4$ slurry into a hold tank (preferably a stirred receiving vessel). The proportional relationship of the two raw materials is first established by titration and the metering pumps set accordingly. The desired pH of the reaction mixture is 3 and is controlled by varying the ratio of the metering rates of the reactants. The $SbSbS_4$ slurry is pumped from the hold tank to another feeding tank located directly above a 24 inch center slung centrifuge. The material is gravity fed to the centrifuge until an adequate cake is formed. The cake is cut out and transported by belt feeder to an agitated kettle for washing to reduce the chloride level to acceptable limits, i.e., less than 300 ppm.

This invention provides many advantages over existing methods, including: (a) the use of a less expensive and stable starting material (a halide stabilized antimony trihalide complex); (b) elimination of drastic reduction of both free sulfur and hydrogen sulfide by-products; (c) continuous processing; (d) generation of readily disposable waste by-products; and (e) high yields.

This invention includes the use of an aqueous solution of a halide stabilized antimony trichloride complex formed by reaction of $Sb_2O_3$ with concentrated hydrochloric acid and NaCl (excess). This complex is stable in low pH range and has good shelf life. The formula for the ion of the complex is believed to be $(SbCl_4)-$ and the complex is preferably $NaSbCl_4$.

It is believed that the most critical characterizing features of the invention are: (i) maintenance of the pH of the reaction medium at a pH of less than 7, and (ii) the use of the halide stabilized antimony thioantimonate.

It is believed that rapid mixing of the reactants favors maintenance of the pH below 7 within all areas of the mixing zone at all times (the $HSbCl_4$ or $NaSbCl_4$ solution is highly acidic while the $Na_3SbS_4$ is highly basic with a pH typically of about 11).

It is also desirable to use a molar excess of the trihalide complex, typically 2% to 20% excess (preferably 2–10%).

EXAMPLES 1–10

Examples 1 through 10 (presented in Table I) demonstrate how certain reaction parameters of the process affect the overall yield, free sulfur content, hydrogen sulfide liberation and chloride content. The reaction sequence, starting materials, and by-products generated in the present invention are shown in the following steps:

$$3Na_2S \cdot 9H_2O + 2S + Sb_2S_3 \rightarrow 2Na_3SbS_4 + 27H_2O \qquad \text{I.}$$

$$Sb_2O_3 + 6HCl + 2Cl^- \rightarrow 2SbCl_4^- + 3H_2O \qquad \text{II.}$$

$$Na_3SbS_4 + SbCl_4^- \rightarrow SbSbS_4 + 3Na^+ + 4Cl^- \qquad \text{III.}$$

The results of Examples 1 through 9 are recorded in Table I.

The preparation of $Na_3SbS_4$ (Reaction I) has been described in U.S. Pat. No. 3,965,016.

The preparation of $HSbCl_4$ (Reaction II) is carried out by stirring and heating to 70°–75° C. a mixture of white $Sb_2O_3$ and 37–39% HCl to form a clear solution. The details for the preparation of the final product (Reaction III), $SbSbS_4$, including reaction temperature, addition time, agitation speed, etc., are recorded in Table I. Reaction III can provide the chloride ions (recycled) needed in Reaction II. The final product is washed with either distilled water or 1% $NaHCO_3$, or both.

The mole percentage values ($H_2S/SbSbS_4$)—a measure of $H_2S$ liberated—were obtained by precipitating $H_2S$ with lead acetate. This is accomplished by passing the exhaust gases from the $SbSbS_4$ reaction through a $Pb(OAC)_2$ solution. The $H_2S$ evolved is precipitated out as PbS which is collected, dried and weighed. From the weight of PbS and the actual yield of $SbSbS_4$, the mole percentage of $H_2S$ over $SbSbS_4$ is calculated (e.g. moles $H_2S \div$ moles $SbSbS_4 \times 100$).

EXAMPLE 11

Example 11 demonstrates the continuous processing conditions for the large scale preparation of $SbSbS_4$.

Preparation of Sodium Thioantimonate Solutions (Reaction I)

In a typical reaction for preparing $Na_3SbS_4$, a 210 gallon KYNAR*-lined stirred reactor was used. The reactor was first charged with 140 gallons of hot water (180° F.) followed by 160 pounds of sodium sulfide ($Na_2S \cdot 3H_2O$), 137 pounds of antimony sulfide ($Sb_2S_3$) and 25 pounds of sulfur powder. This mixture was heated to 200° F. and held for four hours. Then 60 gallons of cool water was added to prevent crystallization of the $Na_3SbS_4$ and the solution cooled with brine to 32° F. The entire contents were then filtered through a 5 micron bag filter into a storage vessel.

*Trademark of Pennwalt Corporation for polyvinylidene fluoride film.

In another example, the material was filtered through a carbon filter.

In another example, the solution was allowed to stand and the clear solution was decanted.

Preparation of Halide Stabilized Antimony Chloride Solutions (Reaction II)

In a typical reaction for preparing halide stabilized $SbCl_3$ solution, a stirred Hastalloy "C" kettle was used. Thirty-four gallons (324 pounds) of 20° Baume hydrochloric acid was added to the reactor followed by 68 pounds of antimony oxide, $Sb_2O_3$. This was mixed until in solution. Then 71 pounds of sodium chloride was added. Then an additional 68 pounds of antimony oxide was slowly added with continued mixing. The solution was then filtered through a carbon filter into a storage container.

The balanced equation for this reaction is believed to be:

$$Sb_2O_3 + 6HCl + 2NaCl \rightarrow 2NaSbCl_4 + 3H_2O \text{ with excess NaCl.}$$

Thus, six moles of HCl are required for each mole of $Sb_2O_3$ and the NaCl is present in excess.

The $Sb_2O_3$ is preferably added in two parts to enhance solubilization of the $Sb_2O_3$. The process could be carried out with one step addition of the $Sb_2O_3$, if preceded by the NaCl addition.

until it covered the mixer blades. The pumps for the halide stabilized $SbCl_3$ and $Na_3SbS_4$ solutions were started to commence the method. The pH of the product outflow into the receiver is monitored. If the pH went outside the range of about 2–4 the metering pumps were adjusted.

TABLE I

Preparation of $SbSbS_4$ via $Sb_2O_3$ + HCl and Then $Na_3SbS_4$ in an All Aqueous System

| Example No. | $HSbCl_4$ | | $Na_3SbS_4$ | | | | Agitation Approx. RPM | Time Stirred Cold After Addition | Time Stirred at Ambient Temp. |
|---|---|---|---|---|---|---|---|---|---|
| | $Sb_2O_3$ Charged grams | HCl (37.9%) Added grams | ml Added | % of Theor. | Time of Addition min | Temp. °C. Change During Addition | | | |
| 1 | 14.6 | 38.5 | 117 | 100 | 1.0 | +1–26.5 | 180 | | 1.17 hr |
| 2 | 14.6 | 38.5 | 117 | 100 | 2.25 | 0–22° | 180 | | 1 hr |
| 3 | 14.6 | 38.5 | 139 | 95 | 1.2 | 0–23° | 180 | | 1.1 hr |
| 4 | 14.6 | 38.5 | 139 | 95 | 1.0 | 0–26° | 180 | 20 min | 1.0 hr |
| 5 | 14.6 | 38.5 | 139 | 95 | 1.0 | 0–26° | 180 | 23 min | 1.0 hr |
| 6 | 14.6 | 38.5 | 139 | 95 | 1.0 | +2–26° | 180 | 33 min | 1.4 hr |
| 7 | 14.6 | 38.5 | 133 | 95 | 1.0 | +1–26° | 180 | 35 min | 1.0 hr |
| 8 | 14.6 | 38.5 | 131 | 90 | 1.1 | −2–17° | 180 | 24 min | 1.2 hr |
| 9 | 14.6 | 38.5 | 133 | 95 | 1.1 | 21.5–28° | 180 | | 1.0 hr |
| 10 | 14.6 | 38.5 | 133 | 95 | 1.0 | −2–24° | 180 | 20 min | 1.4 hr |

| Example No. | No. of Washes and Medium | Grams of $SbSbS_4$ | % Yield Based on $Sb_2O_3$ | % Free Sulfur | Mole % $H_2S/SbSbS_4$ | % Chloride | Remarks |
|---|---|---|---|---|---|---|---|
| 1 | 4-dist. $H_2O$ ambient temp. | 36.5 | 98.1 | 2.1 | 2.9 | | Rapid addition of $Na_3SbS_4$ solution. |
| 2 | 4-dist. $H_2O$ ambient temp. | 36.5 | 98.1 | 1.8 | 4.5 | | Rapid addition of $Na_3SbS_4$ solution. |
| 3 | 4-dist. $H_2O$ ambient temp. | 34.3 | 92.2 | 0.8 | 1.5 | | Rapid addition of $Na_3SbS_4$ solution. |
| 4 | 4-dist. $H_2O$ ambient temp. | 34.3 | 92.2 | 0.6 (0.52 anal) | 0.5 | 0.08 | Rapid addition of $Na_3SbS_4$ solution. |
| 5 | 3-1% $NaHCO_3$ ambient temp. | 34.2 | 91.2 | 0.9 | 0.5 | 0.17 | Rapid addition of $Na_3SbS_4$ solution. |
| 6 | 2-1% $NaHCO_3$ 1-dist. $H_2O$ ambient temp. | 34.2 | 91.2 | 0.7 (0.54 anal) | 0.5 | 0.10 | Rapid addition of $Na_3SbS_4$ solution. |
| 7 | 4-70° C. dist. $H_2O$ | 33.2 | 89.2 | 0.5 | 1.0 | 0.14 0.03 | Rapid addition of $Na_3SbS_4$ solution. |
| 8 | 4-dist. $H_2O$ | 33.4 | 89.8 | 0.6 | 0.4 | | Rapid addition of $Na_3SbS_4$ solution. |
| 9 | 4-70° C. dist $H_2O$ | 32.9 | 88.4 | 0.5 | 1.7 | 0.04 | Slight test for $Cl^-$ in 4 In filtrate. |
| 10 | 2-1% $NaHCO_3$ 2-dist. $H_2O$ 70° C. | 32.6 | 87.6 | 0.6 | 1.2 | 0.08 | |

PREPARATION OF SODIUM CHLORIDE SOLUTION

One hundred ten gallons of water was added to a stirred reactor followed by 260 pounds of sodium chloride and mixed until the salt dissolved.

Preparation of Antimony Thioantimonate

The three solutions previously prepared ($Na_3SbS_4$, $SbCl_3$, NaCl) were put in place with Randolph tube pumps for metering into the reactor (Kenic mixer). The product is pumped out of the Kenic mixer into a stirred receiver. In the laboratory, samples of the $Na_3SbS_4$ and $SbCl_3$ complex solution are first reacted to obtain an approximate ratio of volumes to provide the desired reactor pH of 3±2. This information is used to set the initial metering rates for pumping of the $SbCl_3$ and $Na_3SbS_4$ solutions. The $SbSbS_4$ product slurry was centrifuged and washed to remove HCl and sodium chloride. The product was then dried and dedusted.

Sodium chloride solution was loaded into the stirred $SbSbS_4$ receiver (received product from Kenic mixer)

We claim:

1. Method of preparing $SbSbS_4$ product having a low level of free sulfur impurity, comprising mixing aqueous solutions of an alkali metal thioantimonate and a halide stabilized antimony trihalide to form a reaction mixture, while maintaining the reaction mixture at a pH of less than 7, to provide the $SbSbS_4$ product having a low level of free sulfur impurity.

2. The method as defined in claim 1 wherein the alkali metal thioantimonate is sodium thioantimonate and the trihalide is antimony trichloride.

3. The method as defined in claim 1 wherein the pH is less than 4.

4. The method as defined in claims 1, 2, or 3 wherein the alkali metal thioantimonate and trihalide solutions are rapidly mixed.

5. The method as defined in claim 4 wherein the trihalide is present in molar excess to provide a lower level of free sulfur impurity.

6. The method as defined in claim 4 wherein the method is a batch method and the alkali metal thioantimonate is added while mixing to the trihalide solution.

7. The method as defined in claim 4 wherein the method is a continuous method and the alkali metal thioantimonate and trihalide solutions are continuously metered into a mixing zone from which the $SbSbS_4$ product is discharged as a slurry.

8. The method as defined in claim 4 wherein the reaction mixture is maintained at a temperature of less than about 30° C.

9. The method as defined in claim 4 wherein the halide stabilized antimony trihalide is formed by subjecting a mixture that includes $Sb_2O_3$ and concentrated HCl to reaction conditions to provide an aqueous solution of the halide stabilized antimony trihalide.

10. The method as defined in claim 9 wherein the mixture includes an excess of NaCl to provide $NaSbCl_4$.

11. The method as defined in claim 9 wherein the mixture includes antimony metal.

12. The method as defined in claim 11 wherein the mixture includes an excess of NaCl to provide $NaSbCl_4$.

13. The method as defined in claim 4 wherein the halide stabilized antimony trihalide is formed by subjecting a mixture that includes antimony metal and concentrated HCl to reaction conditions to provide an aqueous solution of the halide stabilized antimony trihalide.

14. The method as defined in claim 13 wherein the mixture includes NaCl.

15. The method as defined in claim 1, 2, or 5 wherein the trihalide is a complex that includes the $(SbCl_4)^-$ ion.

16. The method as defined in claim 15 wherein the trihalide complex is selected from the group consisting essentially of $HSbCl_4$, $NaSbCl_4$, $HSbCl_4$ hydrates, $NaSbCl_4$ hydrates, and mixtures thereof.

17. The method as defined in claim 15 wherein the alkali metal thioantimonate and trihalide solutions are rapidly mixed.

18. The method as defined in claim 15 wherein the trihalide is present in molar excess to provide a lower level of free sulfur impurity.

19. The method as defined in claim 15 wherein the method is a batch method and the alkali metal thioantimonate is added while mixing to the trihalide solution.

20. The method as defined in claim 15 wherein the method is a continuous method and the alkali metal thioantimonate and trihalide solutions are continuously metered into a mixing zone from which the $SbSbS_4$ product is discharged as a slurry.

21. The method as defined in claim 15 wherein the reaction mixture is maintained at a temperature of less than about 30° C.

22. The method as defined in claim 4 wherein the $SbSbS_4$ product is separated from the reaction mixture and then washed to reduce the chloride content of the product to less than 300 ppm.

23. The $SbSbS_4$ product of the method as defined in claim 4.

24. The method of preparing $SbSbS_4$ product having a low level of free sulfur impurity, comprising:
(a) metering at controlled rates separate streams of aqueous solutions of an alkali metal thioantimonate and a halide stabilized antimony trihalide into a mixing zone to form a reaction mixture;
(b) maintaining a pH of less than 7 within the reaction mixture; and then
(c) withdrawing the $SbSbS_4$ product from the mixing zone.

25. The method as defined in claim 24 wherein the alkali metal thioantimonate is sodium thioantimonate and the trihalide is antimony trichloride.

26. The method as defined in claim 25 wherein the pH is less than 4.

27. The method as defined in claims 24, 25, or 26 wherein the alkali metal thioantimonate and trihalide solutions are rapidly mixed.

28. The method as defined in claim 27 wherein the pH of the reaction mixture is maintained by regulating the ratio of the metering rates of the separate streams.

29. The method as defined in claim 27 wherein the method is a continuous method.

30. The method as defined in claim 27 wherein the reaction mixture is maintained at a temperature of less than about 30° C.

31. The method as defined in claim 27 wherein the halide stabilized antimony trihalide is the reaction product of a mixture that includes $Sb_2O_3$ and concentrated HCl.

32. The method as defined in claim 31 wherein the mixture includes NaCl.

33. The method as defined in claim 31 wherein the mixture includes antimony metal.

34. The method as defined in claim 33 wherein the mixture includes NaCl.

35. The method as defined in claim 27 wherein the halide stabilized antimony trihalide is the reaction product of reactants that include antimony metal and concentrated HCl.

36. The method as defined in claim 35 wherein the mixture includes an excess of NaCl.

37. The method as defined in claim 24, 25, 26, 28, 29, or 31 wherein the trihalide is a complex that includes the $(SbCl_4)^-$ ion.

38. The method as defined in claim 37 wherein the trihalide complex is selected from the group consisting essentially of $HSbCl_4$, $NaSbCl_4$, $HSbCl_4$ hydrates, $NaSbCl_4$ hydrates, and mixtures thereof.

39. The method as defined in claim 27 wherein the withdrawn $SbSbS_4$ product is washed to reduce the chloride content of the product to less than 300 ppm based on the weight of product.

40. The method as defined in claim 27 wherein the withdrawn product and remaining reaction mixture are transferred to a receiving vessel containing aqueous NaCl with continued mixing.

41. A composition comprising $SbSbS_4$ and a halide stabilized antimony trihalide.

42. The composition of claim 41 having the halide stabilized antimony trihalide present in an amount within the range of 1 to 300 ppm based on the weight of $SbSbS_4$.

43. The composition of claim 41 or 42 wherein the antimony trihalide is antimony trichloride.

44. The composition of claim 41 or 42 wherein the trihalide is a complex that includes the $(SbCl_4)^-$ ion.

* * * * *